United States Patent [19]
Unishi et al.

[11] Patent Number: 6,147,770
[45] Date of Patent: *Nov. 14, 2000

[54] IMAGE PROCESSING SYSTEM AND CONTROL METHOD THEREOF

[75] Inventors: Masaki Unishi, Kawasaki; Hiroharu Takahashi, Yokohama; Shin Muto, Kawasaki, all of Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/844,370

[22] Filed: Apr. 18, 1997

[30] Foreign Application Priority Data

Apr. 23, 1996 [JP] Japan ..................................... 8-101704
Apr. 8, 1997 [JP] Japan ..................................... 9-089297

[51] Int. Cl.⁷ .................................................... G06K 15/00
[52] U.S. Cl. ........................................... 358/1.2; 358/1.13
[58] Field of Search ..................................... 395/102, 112, 395/101, 106, 109, 114, 117; 250/208.1, 203.3; 358/445, 447, 448, 451, 453, 468, 471, 474, 444, 497, 1.1, 1.2, 1.6, 1.9, 1.13, 1.15, 1.18

[56] References Cited

U.S. PATENT DOCUMENTS

| | | | |
|---|---|---|---|
| 5,021,892 | 6/1991 | Kita et al. | 358/468 |
| 5,585,620 | 12/1996 | Nakamura et al. | 250/208.1 |
| 5,668,637 | 9/1997 | Yamaguchi | 358/296 |
| 5,673,124 | 9/1997 | Kaji et al. | 358/474 |
| 5,699,102 | 12/1997 | Ng et al. | 347/224 |
| 5,699,489 | 12/1997 | Yokomizo | 395/109 |

*Primary Examiner*—Arthur G. Evans
*Attorney, Agent, or Firm*—Fitzpatrick, Cella, Harper & Scinto

[57] ABSTRACT

An image processing system including a host computer, a scanner and a printer, which can reduce the load added to the host computer as well as burden to a user, and improve data transfer efficiency. When an image is scanned by the scanner connected to the host computer, the processing conventionally performed by the host computer or a printer is selected by a scan control selection unit and the selected processing is performed at the time of scanning.

22 Claims, 7 Drawing Sheets

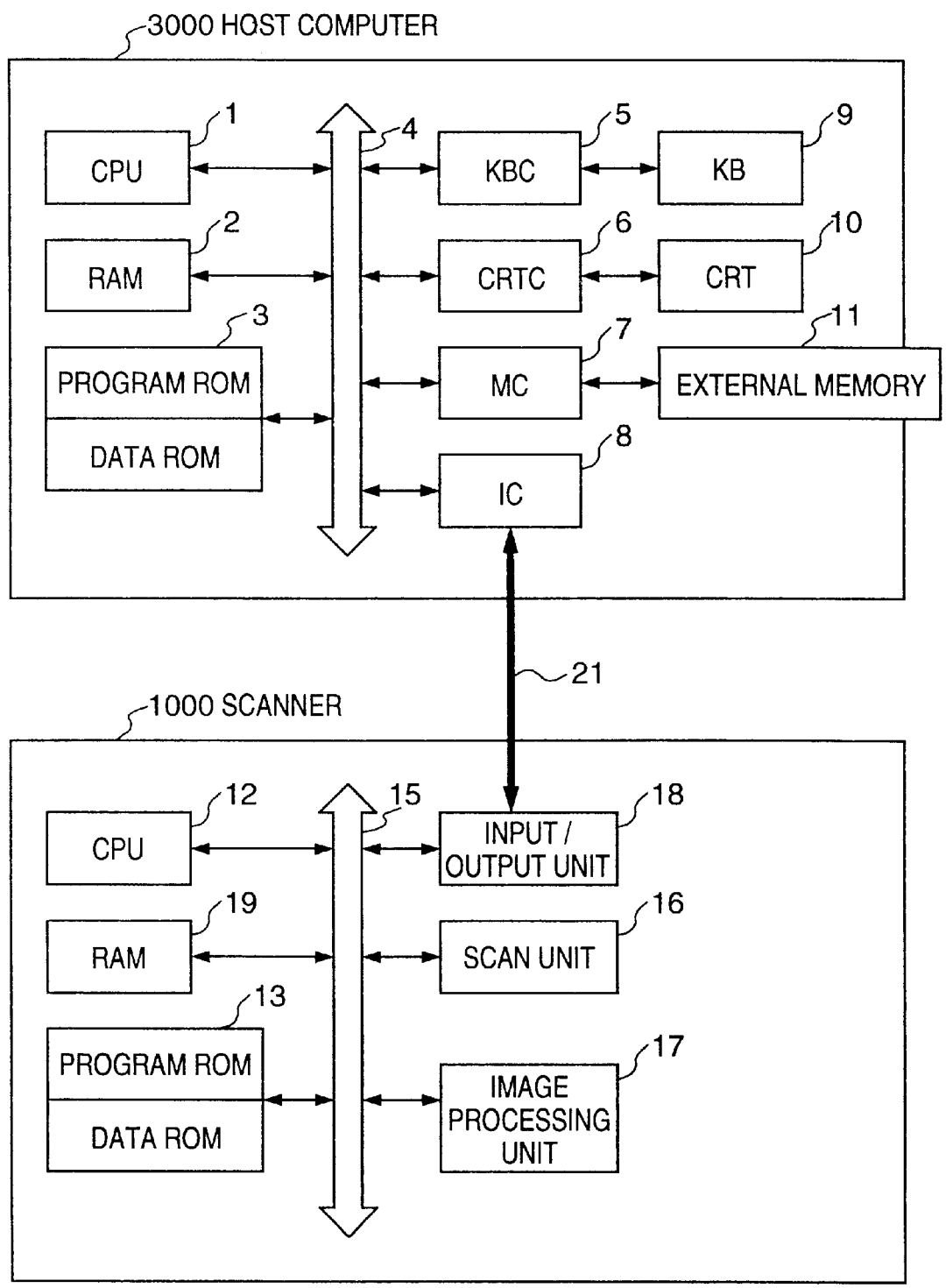
F I G. 1

IMAGE PROCESSING SYSTEM AND CONTROL METHOD THEREOF

BACKGROUND OF THE INVENTION

Present invention relates to an image processing system including an external apparatus such as a host computer or the like and a scanner for scanning an image, and a control method of the image processing system.

In the conventional image processing system, data input by a scanner is subjected to processing such as enlargement/reduction, clipping, resolution conversion or the like by a host computer or an image processing apparatus, and is outputted to a printer as necessary.

Thus, particularly when the scanned data is transferred to a printer via a host computer for the purpose of printing, the load added to the host computer increases and burden of a user also increases. Also, since the amount of data to be transferred is large, efficiency in transfer processing is poor.

Moreover, in a case where the aforementioned image processing is executed by software on the host computer, the execution requires a long time, resulting in poor efficiency in the processing.

SUMMARY OF THE INVENTION

The present invention has been made in consideration of the above situation, and has as its object to provide an image processing system and control method thereof which can improve data transfer speed by optimizing the amount of transferring data.

Another object of the present invention is to reduce the load added to a host computer and optimize redundant operation by performing the processing, which has conventionally been executed by a host computer, at the time of scanning.

Still another object of the present invention is to automatically perform data processing, thereby improving operability of the image processing system.

In order to attain the above objects, the present invention provides an image processing system including a host computer, a scanner for scanning an image, and a printer for performing printing in accordance with the image data, comprising: input means for inputting data regarding the printer, from the host computer to the scanner; scan control means for selecting a predetermined processing on the basis of the data inputted by the input means and controlling the scanner such that the scanner performs the selected processing; and output means for outputting image data scanned and processed by the scanner to the host computer.

Furthermore, in order to attain the above objects, the present invention provides a scanner for scanning an image, comprising: input means for inputting data regarding a printer, from a host computer; scan means for selecting a predetermined processing on the basis of the data inputted by the input means and scanning an image to perform the selected processing; and output means for outputting the scanned and processed image data to the host computer.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 1 is a block diagram showing the main elements of an image processing system according to the present embodiment;

DETAILED DESCRIPTION OF THE PREFERRED EMBODIMENT

Figure 2:
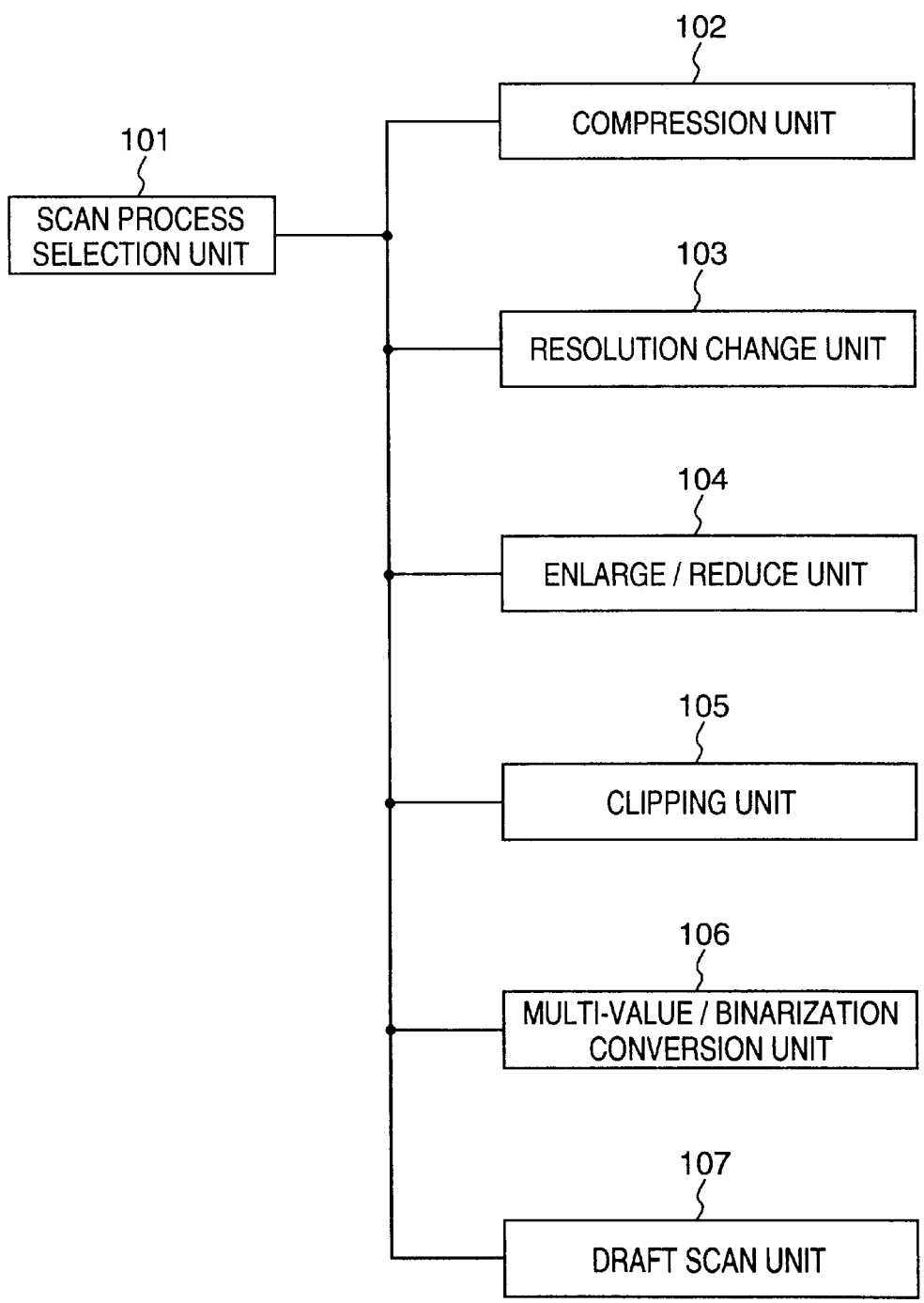
FIG. 2 is a block diagram of an image processing unit according to the present embodiment.

Preferred embodiment of the present invention will be described in detail in accordance with the accompanying drawings.

FIG. 1 shows the construction of a host computer and a scanner according to the present embodiment. Note that as long as the function of the present invention is realized, the present embodiment may be a single device, or a system constituted by a plurality of devices, or a system whose processing is performed via a network such as a LAN.

Referring to FIG. 1, reference numeral 3000 denotes a host computer having a CPU 1 which performs processing of documents, including a drawing, image, character, table (including spreadsheet or the like) or the like, in accordance with a document processing program stored in a program-ROM in ROM 3. The CPU 1 performs general controlling of each of the devices connected to a system bus 4.

In the program-ROM in the ROM 3, control programs or the like for the CPU 1 are stored, and in a data-ROM, various control data or the like is stored.

Reference numeral 2 denotes a RAM serving as a main memory and a work area of the CPU 1. Reference numeral 5 denotes a keyboard controller (KBC) which controls input instruction or an instruction inputted by a pointing device (not shown) or the like. Reference numeral 6 denotes a CRT controller which controls displaying on a CRT display 10 (CRT). Reference numeral 7 denotes a memory controller (MC) which controls access to hard disk (HD) storing boot programs, various applications, font data, user files, edit files or the like, and also controls access to an external memory 11 such as floppy disk (FD) or the like. Reference numeral 8 denotes an interface controller (IC) connected to an external apparatus (e.g. a scanner or printer to be described later) via a predetermined bi-directional interface 21.

Note that the CPU 1 executes developing processing (e.g. rasterizing) of an outline font in a display information RAM (not shown) established in the RAM 2, realizing WYSIWYG (What You See Is What You Get) on the CRT 10. In addition, the CPU 1 performs various data processing by opening various registered windows in accordance with a command instructed by a mouse or a cursor (not shown) displayed on the CRT 10.

Reference numeral 1000 denotes a scanner which photoelectrically reads an image from an original document by an image sensor such as a CCD or the like. The scanner 1000 is connected to the host computer 3000 via the interface 21. The scanner 1000 may be connected to an input unit of a printer. The scanner 1000 operates in accordance with data inputted externally. Reference numeral 12 denotes a CPU of the scanner 1000, and performs general controlling of access to various devices connected to a system bus 15 in accordance with control programs stored in a program-ROM in a ROM 13 or control programs stored in a RAM 19. Reference numeral 16 denotes a scan unit which scans a subject image when a scan instruction is sent by the CPU 12. The scanned image data is then sent to the host computer 3000 via an input unit 18.

Note that the scanned data may be transferred directly to a printer or the like by connecting the present scanner with other peripheral devices.

Reference numeral 17 denotes an image processing unit which executes one or a plurality of image processing such as data compression, resolution conversion, enlargement/reduction, clipping, multi-value/binarization conversion or the like, on the image data outputted by the scan unit 16.

FIG. 2 shows the construction of the image processing unit 17 of the scanner 1000.

In FIG. 2, reference numeral 101 denotes a scan process selection unit which selects one of a plurality of scan processing (means) to be described later; 102, a compression unit which performs various data compression; 103, a resolution change unit which changes resolution of image data; 104, an enlarge/reduce unit which performs enlargement or reduction of image data; 105, a clipping unit which performs clipping of image data; 106, a multi-value/binarization conversion unit for performing conversion of multi-valued image data to binarized image data; and 107, a draft scan unit.

Figure 3:
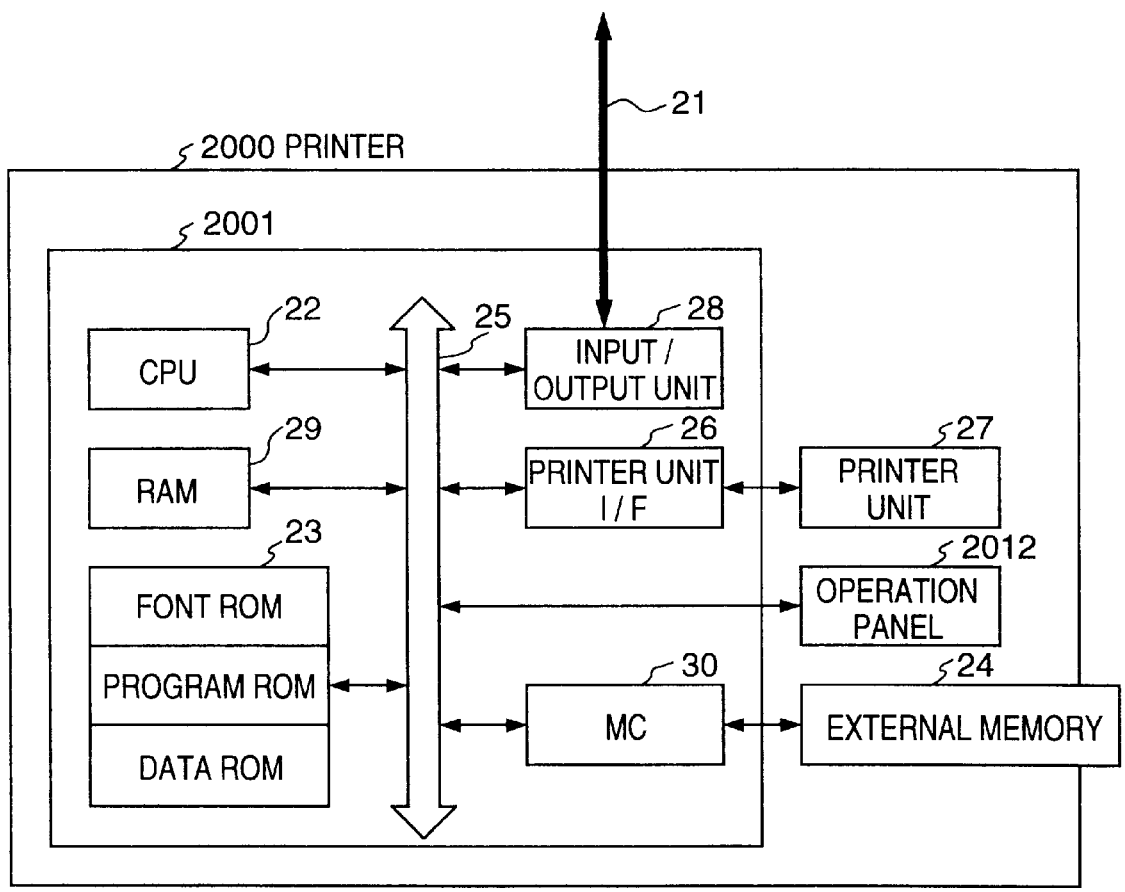
FIG. 3 is a block diagram showing a printer connected to the present image processing system.

FIG. 3 shows the construction of a printer connected to the host computer 3000 via the interface 21. The printer may be connected to the input unit 18 of the scanner 1000.

The printer 2000, e.g. a laser beam printer, ink-jet printer or the like, stores print data inputted by an external unit, generates corresponding character patterns or the like in accordance with the inputted data, and forms an image on a printing medium such as a print sheet or the like. In FIG. 3, reference numeral 2012 denotes an operation panel where various switches and LED display devices or the like are provided for operation. Reference numeral 2001 denotes a printer control unit which controls the entire printer, and analyzes character data or the like supplied by an external apparatus. The printer control unit 2001 mainly converts character data to a video signal having a corresponding character pattern and sends it to a printer unit 27.

In the printer control unit 2001, reference numeral 22 denotes a printer CPU which performs general controlling of access to various devices connected to a system bus 25 in accordance with control programs stored in a program-ROM in a ROM 23 or control programs stored in an external memory 24. The printer CPU 22 then outputs an image signal as output data to the printer unit 27 connected via a printer unit interface 26. Note that in a font-ROM in the ROM 23, font data or the like utilized for generating output data is stored, and in the data-ROM, for a case of a printer not having the external memory 24 e.g. hard disk, data utilized by the host computer is stored. The CPU 22 is constructed such that it is communicable with an external apparatus such as the host computer 3000 or the like via an input unit 28. Reference numeral 29 denotes a RAM serving as a main memory/work area of the CPU 22; and 30, a memory controller (MC) which controls access to the external memory 24.

Hereinafter, descriptions will be provided on a scanning process performed by a scanner in the image processing system having the above described construction.

[Compression]

First, descriptions will be provided in a case where compression processing is performed in accordance with whether or not a scan-data transfer destination, e.g. printer 2000, has a compression/decompression function. When a scan instruction is sent to the scanner by the host computer 3000, the scanner 1000 makes an inquiry to the host computer 3000 regarding whether or not the printer 2000 has a compression/decompression function. If the printer 2000 has the compression/decompression function, its compression method is also inquired. Thereafter, processing described in FIG. 4 is performed on the data scanned by the scan unit 16.

Figure 4:
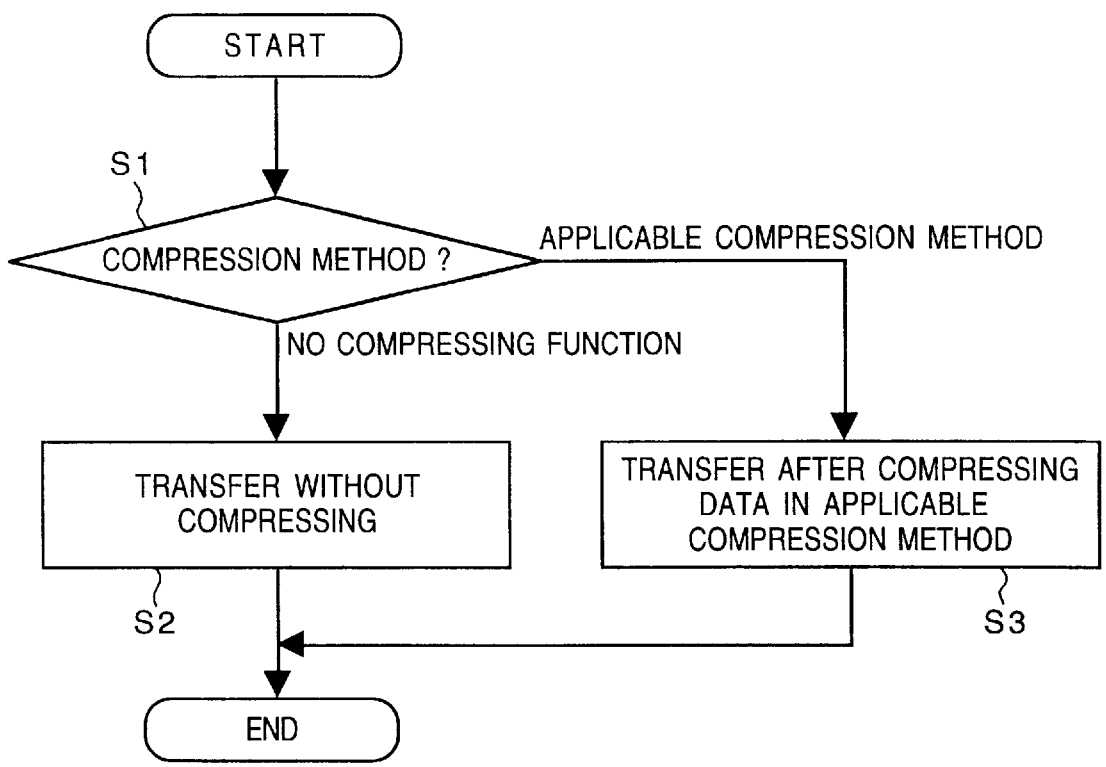
FIG. 4 is a flowchart showing compression processing according to the present embodiment.

In step S1 in FIG. 4, the inquiry is made to the host computer 3000 whether or not the printer 2000 has a compression/decompression function. In accordance with the response from the host computer 3000, if the printer 2000 does not support a compression/decompression function, the processing proceeds to step S2 where the scanned data is transferred to the host computer 3000 without being compressed. If the printer 2000 has a compression/decompression function, the processing proceeds to step S3 where the compression unit 102 of the image processing unit 17 is activated, the scanned image data is compressed according to the compression method, and the resultant data is transferred to the host computer 3000.

In a case where the scan-data transfer destination is capable of processing a plurality of compression methods, the type of compression data which can be processed by the destination is inquired. In addition, the following conditions are also inquired:
the amount of data
decompression speed
lossless compression/lossy compression.

The most appropriate compression method to be used by the compression unit 102 is determined on the basis of these conditions, thereafter the scanned data is transferred to the host computer 3000.

It should be noted that the above description is provided based on the assumption that the image processing system includes a printer, a host computer, and a scanner. However, the description applies to the overall system which performs inputting/outputting and processing of data. In addition, the above described processing may be performed in any portion of the system depending on its construction.

[Resolution Change]

Next, descriptions will be provided in a case where scan resolution is changed in accordance with a resolution specified by the host computer 3000 or a resolution of the printer 2000. When a scan instruction is sent to the scanner 1000 by the host computer 3000, the scanner 1000 makes an inquiry to the host computer 3000 regarding a resolution of the printer 2000. Thereafter, the scanner 1000 performs processing described in FIG. 5.

Figure 5:
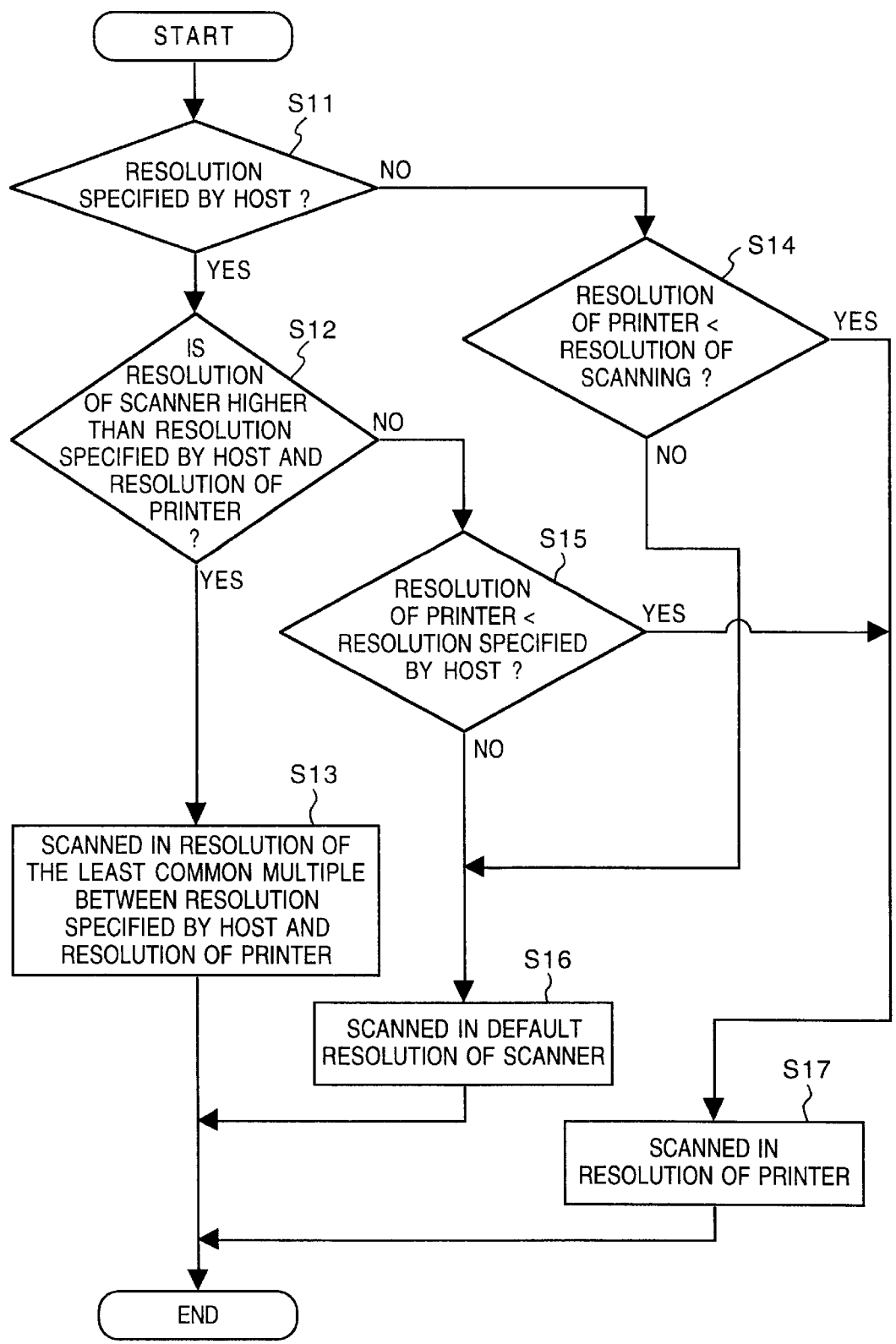
FIG. 5 is a flowchart showing resolution change processing according to the present embodiment.

In step S11 in FIG. 5, the scanner 1000 determines whether or not scan resolution is specified by the host computer 3000. If it is specified, the processing proceeds to step S12 where comparison is made to find if the resolution of the scan unit 16 is higher than the specified resolution specified by the host computer 3000 and the resolution of the printer 2000. If the resolution of the scan unit 16 is higher, the processing proceeds to step S13 where the resolution change unit 103 of the image processing unit 17 is operated such that image data outputted by the scan unit 16 is converted to have a resolution of the least common multiple between the specified resolution specified by the host computer 3000 and the resolution of the printer 2000.

Meanwhile, if the resolution of the scan unit 16 is lower than the specified resolution specified by the host computer 3000 and the resolution of the printer 2000, the processing proceeds to step S15 where comparison is made between the resolution of the printer 2000 and the specified resolution specified by the host computer 3000. Herein, in a case where the resolution of the printer 2000 is lower than the specified resolution of the host computer 3000, the processing proceeds to step S17 where the resolution change unit 103 is operated such that the image data outputted by the scan unit 16 is converted to have the same resolution as that of the printer 2000. In a case where the resolution of the printer 2000 is higher than the specified resolution of the host computer 3000, the processing proceeds to step S16 where the image data is outputted in a default resolution of the scan unit 16.

Meanwhile, in the above-described step S11, if resolution is not specified by the host computer 3000, the processing proceeds to step S14 where comparison is made between the resolution of the printer 2000 and the resolution of the scan unit 16. Herein, if the resolution of the printer 2000 is lower than the resolution of the scan unit 16, the processing proceeds to above-described step S17, where the resolution change unit 103 is operated such that the image data outputted by the scan unit 16 is converted to have the same resolution as that of the printer 2000. If the resolution of the printer 2000 is higher than the resolution of the scan unit 16, the processing proceeds to above-described step S16 where the image data is outputted in a default resolution of the scan unit 16.

As has been described above, resolution conversion processing is performed on image data as necessary, in accordance with a resolution of a image-data transferring destination, thereafter the scanned data is transferred to a peripheral apparatus such as the host computer 3000 or the printer 2000.

[Enlargement/Reduction/Clipping]

Next, descriptions will be provided in a case where the print area is enlarged/reduced/clipped. When a scan instruction is sent to the scanner 1000 by the host computer 3000, the scanner 1000 makes an inquiry to the host computer 3000 regarding the print area of scanned data in the printer 2000. Thereafter, the processing described in FIG. 6 is performed.

Figure 6:
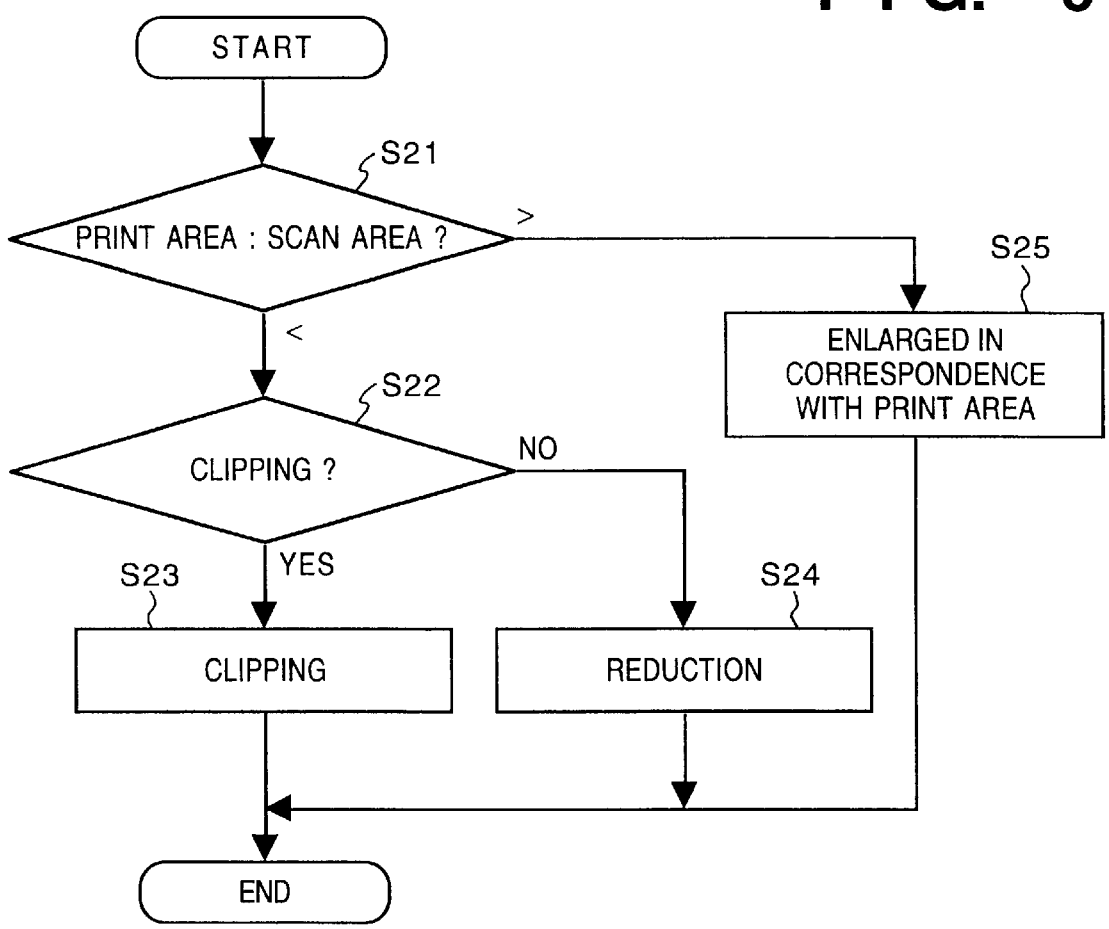
FIG. 6 is a flowchart showing enlargement/reduction/clipping processing according to the present embodiment.
Figure 7:
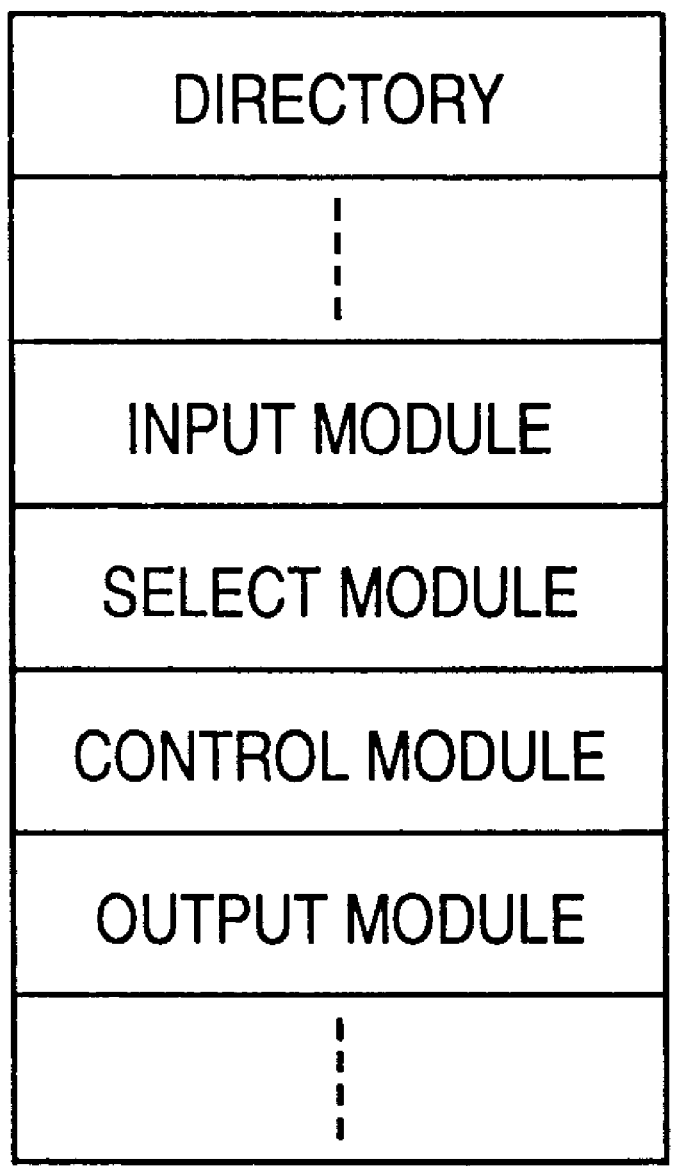
FIG. 7 is a memory map showing each module stored in a computer usable medium.

In step S21 in FIG. 6, comparison is made between the print area informed by the host computer 3000 and the scanned area, and if the print area is smaller than the scanned area, the processing proceeds to step S22. In step S22, it is determined whether or not clipping (area extraction) is to be performed. If clipping is to be performed, the processing proceeds to step S23 where the clipping unit 105 of the image processing unit 17 is operated to perform clipping in correspondence with the print area. If reduction is to be performed in step S22, the processing proceeds to step S24. In step S24, the enlarge/reduce unit 104 of the image processing unit 17 is operated, and reduction is performed such that the scan area fits within in the print area.

Determination of either clipping or reduction may be selected by a user via the host computer 3000. Alternatively, one of the processing may be set as a default process.

Meanwhile, in step S21, if the print area is larger than the scanned area, the processing proceeds to step S25 where the enlarge/reduce unit 104 is operated to perform image enlargement in correspondence with the print area.

[Multi-Value/Binarization Conversion]

Next, descriptions will be provided in a case where multi-value/binarization conversion is performed in accordance with the printer 2000. When a scan instruction is sent by the host computer 3000, the scanner 1000 makes an inquiry to the host computer 3000 regarding whether or not the printer 2000 is capable of handling multi-valued data. If the printer 2000 is incapable of handling multi-valued data, the multi-value/binarization conversion unit 106 is operated so that the multi-valued data is binarized at the time of scanning by the scan unit 16 and then transferred to the host computer 3000.

[Draft Printing]

Next, descriptions will be provided on the draft printing which is instructed for the purpose of test printing of an image. When a scan instruction for draft printing is sent by the host computer 3000, the draft scan unit 107 is operated such that the scan unit 16 of the scanner 1000 performs scanning in low resolution, and the low-resolution image data is transferred to the host computer 3000.

The scan unit 16 may maintain the resolution for draft printing in advance, or the resolution for draft printing may be transmitted by the host computer 3000 along with the scan-instruction.

The present invention can be applied to a system constituted by a plurality of devices (e.g., host computer, interface, reader, printer) or to an apparatus comprising a single device (e.g., copy machine, facsimile).

Further, the object of the present invention can be also achieved by providing a storage medium storing program codes for performing the aforesaid processes to a system or an apparatus, reading the program codes with a computer (e.g., CPU, MPU) of the system or apparatus from the storage medium, then executing the program.

In this case, the program codes read from the storage medium realize the new functions according to the invention, and the storage medium storing the program codes constitutes the invention.

Further, the storage medium, such as a floppy disk, hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiment are realized by executing the program codes which are read by a computer, the present invention includes a case where an OS (Operating System) or the like working on the computer performs a part or entire processes in accordance with designations of the program codes and realizes functions according to the above embodiment.

Furthermore, the present invention also includes a case where, after the program codes read from the storage medium are written in a function expansion card which is inserted into the computer or in a memory provided in a function expansion unit which is connected to the computer, a CPU or the like contained in the function expansion card or unit performs a part or entire process in accordance with designations of the program codes and realizes functions of the above embodiment.

As has been described above, when data is transferred from a scanner to an external apparatus such as a host computer or the like, it is possible to reduce the amount of data by automatically compressing the data, thus improving data transfer efficiency.

In addition, since the various processing such as resolution conversion, enlargement/reduction or the like which have been conventionally performed by a host computer are performed at the time of scanning, the load added to the host computer is reduced, therefore it is possible to optimize redundant operation.

Moreover, since data in the print area is enlarged/reduced/clipped before being transferred to an external apparatus, it is possible to reduce burden of a user and improve operability of the image processing system.

The present invention is not limited to the above embodiments and various changes and modifications can be made within the spirit and scope of the present invention. Therefore, to appraise the public of the scope of the present invention, the following claims are made.

What is claimed is:

1. An image processing system including a host computer, a scanner for scanning an image, and a printer for performing printing in accordance with scanned image data, comprising:

inquiring means for the scanner to inquire of the host computer about a function of the printer;

input means for inputting function data regarding a function of the printer, from the host computer to the scanner;

selecting means for selecting a processing operation to be performed by the scanner on the basis of the function data inputted by said input means in order to obtain image data that is suitable for the function of the printer;

scan control means for controlling the scanner such that the scanner performs the processing operation selected by said selecting means; and output means for outputting image data scanned and processed by the scanner to the host computer.

2. The image processing system according to claim 1, wherein in a case where said input means inputs function data representing that the printer is capable of decompressing compressed data, said selecting means selects a compression processing operation and said scan control means controls the scanner so as to compress the image data in accordance with the selected compression processing operation.

3. The image processing system according to claim 2, wherein in a case where said input means inputs function data representing that the printer is capable of decompressing data compressed in a plurality of compression processing operations, said selecting means selects one of the compression processing operations and said scan control means controls the scanner so as to compress the image data in accordance with the selected compression processing operation.

4. The image processing system according to claim 1, wherein in a case where said input means inputs function data representing a resolution of the printer, and a resolution of the scanner is higher than the resolution of the printer, said selecting means selects the resolution of the printer and said scan control means controls the scanner so as to scan the image with the selected resolution.

5. The image processing system according to claim 1, wherein in a case where said input means inputs function data representing a resolution of the printer, and a resolution specified by the host computer is lower than the resolution of the printer, said selecting means selects the resolution of the printer and said scan control means controls the scanner so as to scan the image with the selected resolution.

6. The image processing system according to claim 1, wherein in a case where said input means inputs function data representing a resolution of the printer, and a resolution of the scanner is higher than a resolution specified by the host computer and the resolution of the printer, said selecting means selects a resolution of the least common multiple between the specified resolution specified by the host computer and the resolution of the printer and said scan control means controls the scanner so as to scan the image with the selected resolution.

7. The image processing system according to claim 1, wherein in a case where said input means inputs function data representing that the printer outputs binary data, said selecting means selects a multi-value/binarization conversion processing operation and said scan control means controls the scanner such that multi-valued image data is converted to binary image data in accordance with the selected multi-value/binarization conversion processing operation.

8. An image processing method in an image processing system including a host computer, a scanner for scanning an image, and a printer for performing printing in accordance with scanned image data, comprising the steps of:

inquiring by the scanner of the host computer about a function of the printer;

inputting function data regarding the function of the printer, from the host computer to the scanner;

selecting a processing operation to be performed by the scanner on the basis of the function data inputted in said input step in order to obtain image data that is suitable for the function of the printer;

controlling the scanner such that the scanner performs the processing operation selected in said selecting step; and outputting image data scanned and processed by the scanner to the host computer.

9. The image processing method according to claim 8, wherein in a case where the input function data represents that the printer is capable of decompressing compressed data, a compression processing operation is selected in said selecting step and the image data is compressed in said controlling step in accordance with the selected compression processing operation.

10. The image processing method according to claim 9, wherein in a case where the input function data represents that the printer is capable of decompressing data compressed in a plurality of compression processing operations, one of the compression processing operations is selected in said selecting step and the image data is compressed in said controlling step in accordance with the selected compression processing operation.

11. The image processing method according to claim 8, wherein in a case where the input function data represents a resolution of the printer, and a resolution of the scanner is higher than the resolution of the printer, the resolution of the printer is selected in said selecting step and the image is scanned in said controlling step with the selected resolution.

12. The image processing method according to claim 8, wherein in a case where the input function data represents a resolution of the printer, and a resolution specified by the host computer is lower than the resolution of the printer, the resolution of the printer is selected in said selecting step and the image is scanned with the selected resolution.

13. The image processing method according to claim 8, wherein in a case where the input function data represents a resolution of the printer, and a resolution of the scanner is higher than a resolution specified by the host computer and the resolution of the printer, a resolution of the least common multiple between the specified resolution specified by the host computer and the resolution of the printer is selected in said selecting step and the image is scanned in said controlling step with the selected resolution.

14. The image processing method according to claim 8, wherein in a case where the input function data represents that the printer outputs binary data, a multi-value/binarization conversion is selected in said selecting step and multi-valued image data is converted to binary image data in said controlling step.

15. A scanner for scanning an image, comprising:

inquiring means for a scanner to inquire of a host computer about a function of a printer;

input means for inputting function data regarding the function of the printer, from the host computer to the scanner;

selecting means for selecting a processing operation to be performed by the scanner on the basis of the function data inputted by said input means in order to obtain image data that is suitable for the function of the printer;

scan means for scanning an image in accordance with the processing operation selected by said selecting means; and output means for outputting to the host computer the image data obtained by said scan means scanning the image.

16. The scanner according to claim 15, wherein in a case where said input means inputs function data representing that the printer is capable of decompressing compressed data, said selecting means selects a compression processing operation and said scan means compresses the image data in accordance with the selected compression processing operation.

17. The scanner according to claim 16, wherein in a case where said input means inputs function data representing that the printer is capable of decompressing data compressed in a plurality of compression methods, said selecting means selects one of the compression methods and said scan means compresses the image data in accordance with the selected compression method.

18. The scanner according to claim 15, wherein in a case where said input means inputs function data representing a resolution of the printer, and a resolution of the scanner is higher than the resolution of the printer, said selecting means selects the resolution of the printer and said scan means scans the image with the selected resolution.

19. The scanner according to claim 15, wherein in a case where said input means inputs function data representing a resolution of the printer, and a resolution specified by the host computer is lower than the resolution of the printer, said selecting means selects the resolution of the printer and said scan means scans the image with the selected resolution.

20. The scanner according to claim 15, wherein in a case where said input means inputs function data representing a resolution of the printer, and a resolution of the scanner is higher than a resolution specified by the host computer and the resolution of the printer, said selecting means selects a resolution of the least common multiple between the specified resolution specified by the host computer and the resolution of the printer, and said scan means scans the image with the selected resolution.

21. The scanner according to claim 15, wherein in a case where said input means inputs function data representing that the printer outputs binary data, said selecting means selects a multi-value/binarization conversion processing operation, and said scan means converts multi-valued image data into binary image data.

22. A computer program product comprising a computer usable medium having computer readable program code means embodied in said medium for an image processing method in an image processing system including a host computer, a scanner for scanning an image, and a printer for performing printing in accordance with scanned image data, said product including:

computer readable program code means for inquiring by the scanner of the host computer about a function of the printer;

computer readable program code means for inputting function data regarding the function of the printer, from the host computer to the scanner;

computer readable program code means for selecting a processing operation to be performed by the scanner on the basis of the inputted function data in order to obtain image data that is suitable for the function of the printer;

computer readable program code means for controlling the scanner such that the scanner performs the selected processing operation; and computer readable program code means for outputting image data scanned and processed by the scanner to the host computer.

* * * * *